United States Patent [19]

Murray

[11] 4,225,006
[45] Sep. 30, 1980

[54] VEHICLE CONTROL SPEED SENSING METHOD AND APPARATUS

[76] Inventor: Alan B. Murray, 12 Forest Dr., Forest Hills, Kloof, Natal Province, South Africa

[21] Appl. No.: 1,419

[22] Filed: Jan. 8, 1979

Related U.S. Application Data

[62] Division of Ser. No. 707,342, Jul. 21, 1976, Pat. No. 4,174,765.

[30] Foreign Application Priority Data

Jul. 23, 1975 [ZA] South Africa ............... 75/4748

[51] Int. Cl.² .......................................... B60K 31/00
[52] U.S. Cl. ................................. 180/179; 73/519; 324/163
[58] Field of Search ............... 180/105 R, 105 E, 179; 123/102, 105; 73/229, 231 R, 518, 519; 310/168; 324/173, 174, 163; 323/66; 361/239, 240

[56] References Cited

U.S. PATENT DOCUMENTS

| | | | |
|---|---|---|---|
| 3,002,384 | 10/1961 | MacDonald | 73/231 R |
| 3,049,110 | 8/1962 | Kerr | 123/102 |
| 3,224,271 | 12/1965 | Ichihar | 73/229 |
| 3,406,775 | 10/1968 | Magnuski | 180/105 R |
| 3,619,680 | 11/1971 | Okamoto | 310/168 |
| 3,647,017 | 3/1972 | Brainard | 180/105 R |

FOREIGN PATENT DOCUMENTS

1195532 6/1970 United Kingdom .
1251374 10/1971 United Kingdom .
1288589 9/1972 United Kingdom .

*Primary Examiner*—Stephen G. Kunin
*Assistant Examiner*—Terrance L. Siemens
*Attorney, Agent, or Firm*—Stevens, Davis, Miller & Mosher

[57] ABSTRACT

This invention relates to a method of and apparatus for controlling the operation of a vehicle by means of electrical signals generated in a manner dependent on the road speed of the vehicle wherein the method comprises setting up a specific magnetic field in association with a normally unmagnetized component of the vehicle which rotates at a speed proportional to the road speed of the vehicle and sensing variations in the magnetic field in a coil located on the opposite side of a ferromagnetic member of the vehicle to the component and amplifying the signal through a high gain amplifier.

3 Claims, 5 Drawing Figures

VEHICLE CONTROL SPEED SENSING METHOD AND APPARATUS

This is a division of application Ser. No. 707,342 filed July 21, 1976, now U.S. Pat. No. 4,174,765.

BACKGROUND TO THE INVENTION

This invention relates to a method of and means for controlling the operation of a vehicle by means of electrical signals generated in a manner dependent on the road speed of the vehicle.

Signals so generated can be used in a wide range of applications such as speed warning devices, actuation of servo-mechanisms which could be used to control vehicle speeds, the monitoring of fuel consumption and, through the medium of a computer, more sophisticated controls between adjacent vehicles could be developed. All these applications are dependent on proper speed determination which will enable many computations involving vehicle speed and other variables to be achieved.

It is widely known that road speed related electrical signals can be obtained by monitoring the rotational movement of a component of the vehicle which moves proportionally to the road speed of the vehicle. This monitoring has been effected by the use of a photo-electric cell arrangement set up to observe a predetermined mark on a rotating component.

Also and more generally the monitoring has been effected by detecting the variation of a magnetic field associated with a rotating component of the vehicle and using this magnetic field variation to generate an electrical signal through the detector. The signal may be amplified and used to power or to trigger the particular vehicle control means for which the system has been designed.

Special devices to meet the requirements of individual installation have been made to work with reasonable success but the problem has always remained in that the wide variety of vehicles has heretofore made it practically impossible to provide a method and means which can be universally applied to all motor vehicles. Various methods known to the Applicants are the attachment of permanent magnets to wheel rims or drive shafts with the detecting or sensing heads located in just opposition thereto. These means are particularly susceptible to damage as they are outside the protective body of the vehicle and the installation of the detector has lead to difficult problems.

It has also been proposed to fit a drive shaft with a toothed wheel and having in close association therewith a magnetized magnetic sensor. This arrangement is subject to similar damage to that referred to above and the proposal is not possible with vehicles having only front wheel drive assemblies.

Also, there has been utilization of variations in magnetic flux caused by rotation of means producing a magnetic field associated with a speedometer cable. The latter method can involve the cutting of the speedometer cable to enable magnetic field producing means to be inserted between the cut ends. The disadvantage of sensing magnetic variations in this manner is that speedometer cables sometimes develope "whiplash", which results in erroneous speed sensing and monitoring.

There has also been the suggestion that the normally existing magnetic component in the vehicle speedometer be used to generate the signal in the sensor. In many of these cases serious accessibility problems arise in practical installations for different types of vehicles. Also different speedometers give rise to variations in frequencies of signals and types of fields.

Because it is essential that the road speed related electrical feed back signal used in vehicle control be reliable and steady, the above methods are not considered by the applicant to be satisfactory.

Finally it is obvious that vehicle engine speed related signals give difficulties in accurate translation to road speed where gearboxes are interposed between the engine and road wheels. Nevertheless engine speed can be usefully used in special applications and, in vehicles having no electrical ignition systems, the methods and means of this invention can conveniently be used. Also the method of this invention can be used where the rotating component is a toothed wheel in an existing vehicle gearbox or differential assembly.

All the above efforts to obtain something that will have wide general application for vehicle control have encountered difficulties through either unsatisfactory signal generation from existing magnetised components or through difficulties encountered in the closely adjacent location of the rotating vehicle component to the sensor which have heretofore been separated only by a very small air gap. This difficulty in location is accentuated by vibrations or relative movements between the sensor and rotating member where the latter is, for example, a drive shaft.

SUMMARY OF THE INVENTION

It is the object of the present invention to provide a method and means of vehicle speed monitoring, and the generation of a corresponding electrical signal which is simple to install and effective in use.

It has been surprisingly found that variations in a magnetic field which can conveniently be introduced into a motor vehicle assembly can be sensed through a solid metal plate of the vehicle and amplified into a useful electrical signal substantially uneffected by any normal electrical noise generated during operation of the vehicle. This applies also to a metallic speedometer cable sheath and the use of such a method for universal application to road vehicles has not heretofore been put into practical effect anywhere to the applicant's knowledge.

According to this invention there is provided a method of generating an electrical signal proportional to the road speed of a vehicle comprising setting up a specific magnetic field in association with a normally magnetized component of the vehicle which rotates at a speed proportional to the road speed of the vehicle and sensing variations in the magnetic field in a coil located on the opposite side of a ferromagnetic member of the vehicle to the component and amplifying the signal through a high gain amplifier.

Further features of this invention provide for the magnetic field to be set up by the physical attachment of at least one permanent magnet to the rotatable component or by the magnetization of at least part of the rotatable component.

The invention also provides for the magnetic field to be set up by a polarized magnet on the opposite side of a ferromagnetic vehicle member to a ferromagnetic rotatable component having an irregular peripheral surface within its circumference of rotation and for the variations in this field due to rotation of the components to be sensed by a coil on the same side of the ferromagnetic vehicle member as the magnet.

Still further features of this invention provide apparatus to give effect to the methods defined above.

DETAILED DESCRIPTIONS OF PREFERRED EMBODIMENTS OF THE INVENTION

Figure 1:
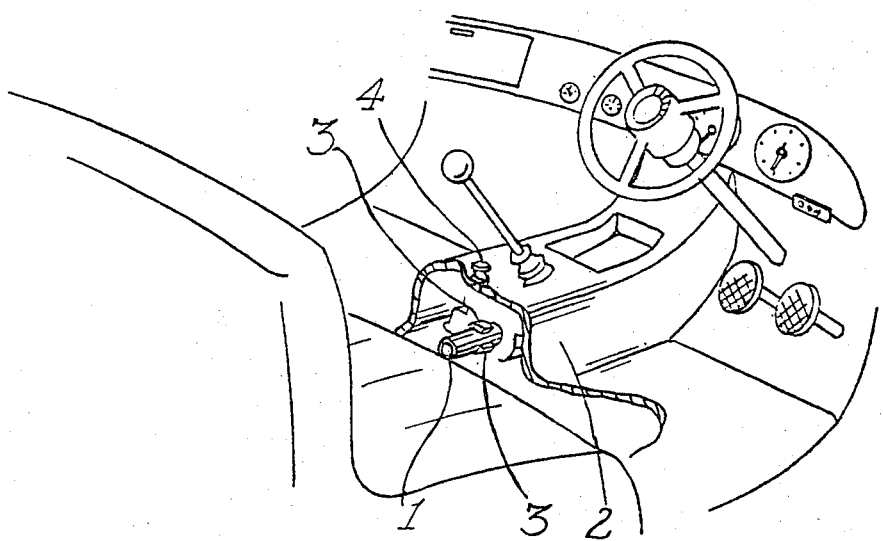
FIG. 1 shows a diagrammatic installation of the invention applied to a vehicle drive shaft with magnets and pick-up coil exaggerated in size.

FIG. 1 illustrates diagrammatically the invention as applied to a motor vehicle having a drive shaft 1 and the usual metal floor 2. In the preferred embodiment, two permanent magnets 3 are attached to the drive shaft of a motor car. The magnets are attached in positions which will least upset the dynamic balance of the drive shaft. Inside the body of the motor vehicle and at a position on the floor 2 thereof near the magnets 3, a coil 4 is mounted. Emphasis must be laid on the fact that the pickup head is inside the car body and the signal is received right through the steel shell.

The mounting of the coil 4 is conveniently effected on or immediately adjacent the usual humped shaft housing without necessitating any substantial modification of the motor cars.

During motion of the vehicle, the rotating drive shaft 1 causes variations in the magnetic field produced by the magnets 3 which variations are proportional to the vehicle speed.

The coil 4 is used in an electrical circuit to sense these variations and effectively transduce them to speed related electric signals.

Figure 2:
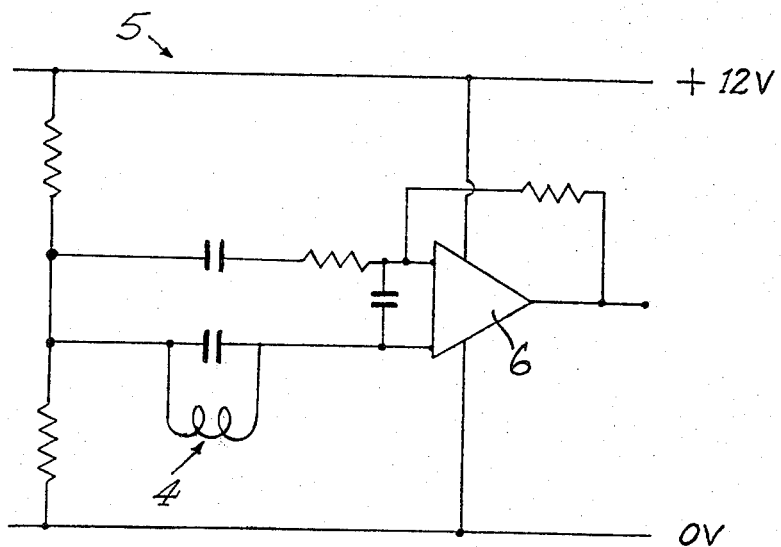
FIG. 2 shows a circuit diagram for an electrical circuit which can be used with any of the embodiments described.

The electrical circuit is shown in simple form in FIG. 2. This circuit 5 includes a differential amplifier 6 across the differential inputs of which currents induced in the coil 4 are applied. The amplifier signal appears at the output. Any interference signals picked up by the lead wire to the coil 4 are applied in phase to the differential amplifier inputs and will therefore be of no effect. This configuration gives the very high amplification required together with excellent noise rejection.

It has been found that the arrangement above described enables useful signals to be generated in spite of the location of the sensor coil 4 on a side of the floor 2 remote from the magnetic field introduced into the vehicle assembly. Further and even more surprising is the fact that variations in the position of the drive shaft 1 relating to the floor 2 during operation of the vehicle as the latter moves over rough road surfaces do not appreciably effect the utility of the output road speed related signal from the circuit 5. Nor do the vibrations inherently induced in the drive shaft 1 during use of the vehicle.

The output signals have proved to be reliable and stable. They may thus be used for many purposes concerning the operation of the vehicle. For example these signals can be used to operate vehicle speed warning devices, or to monitor fuel consumption or operate servo-mechanisms. Clearly once a reliable and accurate road speed related signal for the vehicle has been obtained it can be readily used in many computations with other variables concern in the running of a motor vehicle to enhance validity, economical performance, safety and efficiency.

Figure 3:
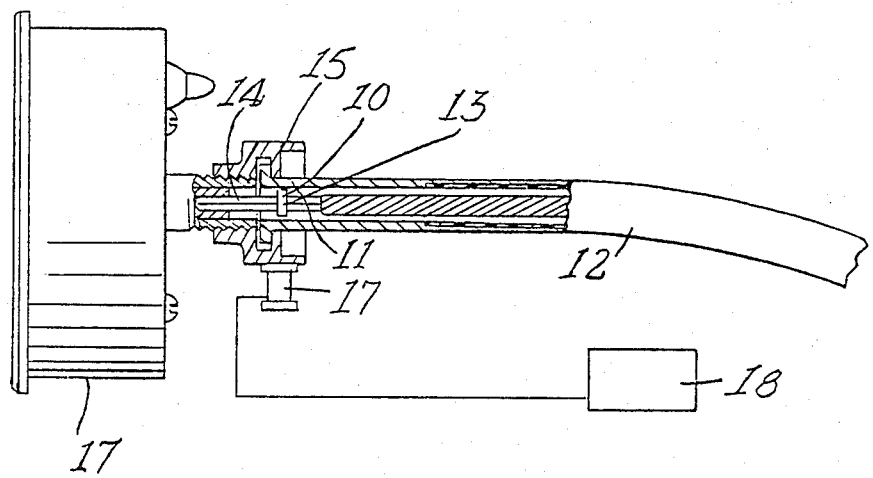
FIGS. 3 and 4 illustrate diagrammatically the invention applied in different ways to a vehicle speedometer cable.

FIG. 3 of the drawings illustrates an alternative embodiment where a disc magnet 10 is used to introduce the necessary magnetic field. In this form the magnet 10 is applied to the inner cable 11 of a speedometer cable assembly and the coil located nearby but outside the outer sheath 12 for the cable.

The disc magnet 10 has a square hole 13 punched axially therethrough so that it can be located and held on the square sectioned end part 14 of the speedometer cable 11 for the vehicle.

The coupling 15 for holding the outer sheath 12 of the speedometer cable to the speedometer housing 16 is used to maintain the disc magnet in the appropriate position but if necessary a suitable cement or clips can be applied to the cable end to hold the disc magnet 10 in position so that it will not interfere with the normal rotation of the cable 11 in the sheath and coupling 15.

The usual speedometer cable assembly in motor vehicles will accommodate the disc magnet 10 mounted as above set forth.

The sensing coil 17 can be mounted on the coupling as indicated or in close proximity thereto in any convenient manner and suitable adhesive tape has been found to be adequate for this purpose.

The sensing coil will be connected to an amplifier circuit 18 as described with reference to FIG. 2 above.

It is to be noted that the sensing coil can be made to eliminate stray signals even though such signals are unlikely to materially interfere with the efficient operation of the equipment. This noise eliminator can be provided for in the form of a sensor having a pair of co-axial coils which are wound in opposite directions and connected in series. The coils are otherwise identical and separated by a flat member.

Figure 4:
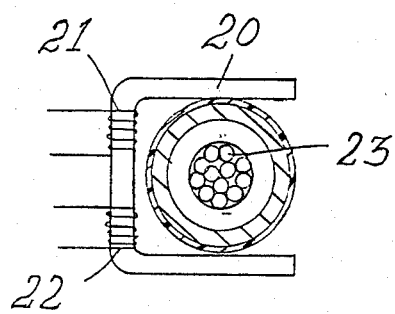

In yet an alternative embodiment of this invention the magnetic field is introduced by the magnetization of the rotating component. While it can be applied to a component such as the vehicle drive shaft, where the shaft or part thereof is preferably permanently magnetised, this embodiment will usually be more easily applied to the inner cable of a speedometer cable assembly. One suitable form is illustrated in FIG. 4 of the drawings.

In this form the device consists of a soft iron U-shaped core 20 with two coils 21, 22 wound around the juncture of the two arms. One coil 21 when pulsed with a high current, polarises the core 23 of the cable while the other coil 22 is used to detect the electrical signal generated by the rotating core within the soft iron armature.

It will be appreciated that the inner core of the speedometer cable may not hold its magnetism indefinitely and the frequency at which the magnetizing current is pulsed through coil 21 may vary from seconds to days or longer, dependent on a particular application.

One simple and effective method of controlling the magnetization of the core into a state sufficient for the effective operation of the invention is to ensure that each positive operation of the vehicle ignition switch ensures first the intense pulsation of current through coil 21 before the starter motor is engaged. Tests have indicated that such a frequency of magnetization, even if irregular, will ensure effective operation of the sensing device.

The device envisaged is particularly simple and easy to manufacture and install by being merely clipped to a convenient point on the speedometer cable.

This form of the invention may also be modified by effecting the magnetization through the use of a permanent magnet or by the creation of the magnetizing field through the pick-up sensor.

Figure 5:
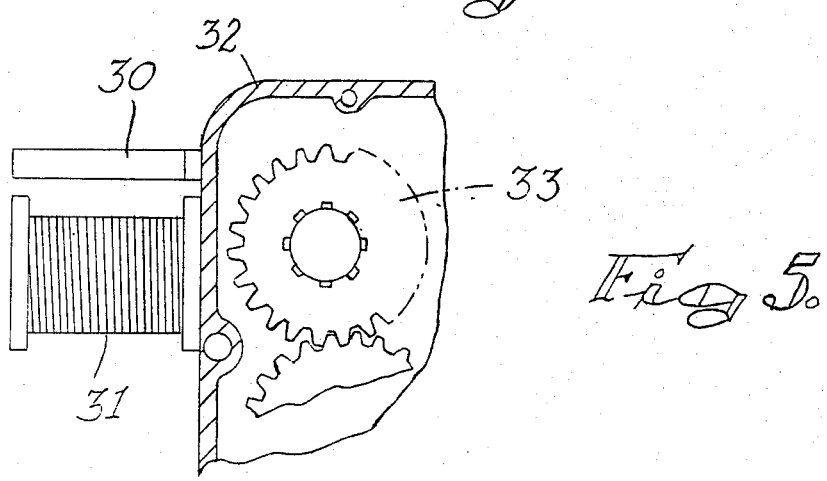
FIG. 5 illustrates the invention with the magnetic field applied on the opposite side of a ferromagnetic plate to the rotating component.

As a final embodiment of the invention, FIG. 5 is used to illustrate the use of a polarized magnet 30 and sensor coil 31 moulded on one side of a ferromagnetic plate 32 with the rotating component 33 on the opposite side.

This detecting device may be used in conjunction with any component of ferromatic material whose movement is relative to the speed of the vehicle.

The device may particularly be mounted externally on a gear housing and detect the motion of ferromagnetic gear teeth by the influence of the latter on the fixed magnetic field.

The device may also be mounted near protruding moving parts such as the knuckles of the drive shaft.

This embodiment of the invention may also be very easily used to monitor the engine speed of a vehicle which has no electrically operated ignition system. The device may be mounted on the outside of a crankcase to monitor rotation of the crankshaft or alternatively it may be applied to the outside of the engine casing where it can monitor the movement of a ferromagnetic piston gudgeon pin. This can be done even through the usual water jacket included in engine casings of this type of vehicle.

The embodiment of FIG. 5 does require that the ferromagnetic periphery of the rotating component be irregular so that there will be a varying influence on the field of the polarized magnet which can be detected by the sensor.

In the embodiments of FIGS. 3, 4 and 5 electrical circuitry as described with reference to FIG. 2 can be used.

This method of monitoring vehicle speed is simple and easily effected and does not involve any substantial modification of vehicle components. The monitoring device comprising the magnet or magnets and the coil may be quickly and easily installed and the mounting of the coil inside the vehicle body or in other protected spaces obviates the danger of damage thereto during use of the vehicle even over rough road conditions. The particular embodiment selected may be determined by the particular vehicle model with which it is to be used but in any event no alteration to a vehicle structure or component is necessary since the sensor and rotating members may be located on opposite sides of existing ferromagnetic protective or other housing members.

What we claim as new and desire to secure by Letters Patent is:

1. A method of generating electrical signals proportional to the road speed of a motor vehicle comprising attaching a pair of bar magnets to the vehicle drive shaft in a symmetrical relationship to extend along the shaft, said magnets being spaced from the motor vehicle body, locating a sensing coil entirely within the motor vehicle body on the floor near the magnets, sensing variations in the magnetic field generated by rotation of the drive shaft in the coil to provide electrical signals and amplifying the signals through a high gain amplifier.

2. Apparatus for generating an electric signal proportional to the road speed of a vehicle by setting up a specific magnetic field in association with a normally unmagnetized component of the vehicle which rotates at a speed proportional to the road speed of the vehicle comprising a sensor in the form of a coil positioned entirely within the vehicle body on the floor of said vehicle over a drive shaft and at least one permanent magnet secured to the vehicle drive shaft to underlie said sensor and lie spaced from said vehicle body.

3. Apparatus for generating an electrical signal proportional to the road speed of a motor vehicle having a floor constructed of ferromagnetic material comprising:
- a normally unmagnetized drive shaft of said vehicle provided under said floor which rotates at a speed proportional to the road speed of said vehicle;
- magnet means provided on said drive shaft and spaced from said floor by a distance substantially greater than the thickness of said ferromagnetic material; and,
- a coil magnetic field sensor provided entirely within said vehicle body and positioned adjacent said floor for sensing magnetic field changes caused by rotation of said magnets on said drive shaft.

* * * * *